(12) United States Patent
Nakata (10) Patent No.: US 6,463,214 B1
(45) Date of Patent: Oct. 8, 2002

(54) MULTI-POINT AUTOFOCUS SYSTEM

(75) Inventor: Masahiro Nakata, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/897,950

(22) Filed: Jul. 5, 2001

(30) Foreign Application Priority Data

Jul. 5, 2000 (JP) ........................................ 2000-204278

(51) Int. Cl.⁷ .............................................. G03B 13/36
(52) U.S. Cl. ........................ 396/104; 396/123; 396/147
(58) Field of Search ................................ 396/104, 121, 396/122, 123, 137, 147

(56) References Cited

U.S. PATENT DOCUMENTS

| | | | |
|---|---|---|---|
| 4,882,601 A | * 11/1989 | Taniguchi et al. | 396/104 |
| 5,721,967 A | * 2/1998 | Akashi | 396/104 X |
| 5,737,642 A | * 4/1998 | Aoyama | 396/104 X |
| 6,097,893 A | * 8/2000 | Nakano | 396/104 X |
| 6,115,553 A | * 9/2000 | Iwamoto | 396/104 |
| 6,128,444 A | 10/2000 | Sensui | 396/114 |

FOREIGN PATENT DOCUMENTS

| | | | |
|---|---|---|---|
| JP | 7-72380 | 3/1995 | G02B/7/34 |
| JP | 00-28908 | 1/2000 | G02B/7/34 |

* cited by examiner

Primary Examiner—W. B. Perkey
(74) Attorney, Agent, or Firm—Greenblum & Bernstein, P.L.C.

(57) ABSTRACT

A multi-point autofocus system includes a focus detection device which can calculate a defocus amount for each of a plurality of focus detection zones in a picture plane; a selecting device for manually selecting a focus detection zone from the plurality of focus detection zones for which the defocus amount is to be calculated by the focus detection device; and a determining device for determining a valid focus detection zone by which a valid defocus amount can be calculated out of at least one of the plurality of focus detection zones other than the manually-selected focus detection zone, in such a manner that a higher priority is given to a focus detection zone than another focus detection zone of the plurality of focus detection zones in the case where the result of a calculation of the defocus amount of the manually-selected focus detection zone is invalid.

19 Claims, 5 Drawing Sheets

MULTI-POINT AUTOFOCUS SYSTEM

BACKGROUND OF THE INVENTION

1. Field of the Invention

The present invention relates to a multi-point autofocus system which can determine a focus state at each of a plurality of focus detection zones, and which is suitable for an optical instrument such as a camera.

2. Description of the Prior Art

In recent years, cameras provided with a multi-point autofocus system for determining a focus state (defocus) at each of a plurality of focus detection zones (focusing points) have been developed. In a camera having such a multi-point autofocus system, for instance, a plurality of focus detection zones are arranged in an "H" shape, and the autofocus operation can be performed via one focus detection zone selected from the plurality of focus detection zones.

In such a camera provided with a multi-point autofocus system, in addition to an automatic focus-zone selection mode in which a focus detection zone is automatically selected from the plurality of focus detection zones, a manual focus-zone selection mode in which a focus detection zone can be manually selected by the user from the plurality of focus detection zones is generally available.

Conventionally, in such a manual focus-zone selection mode, although each focus detection zone can be selected manually so as to make it possible for the user to photograph pictures which conform to his/her intention, the autofocus operation cannot be performed to stop performing subsequent operations if the calculated amount of defocus is invalid for the focus detection zone selected by the user (i.e., if a valid amount of defocus cannot be obtained at the focus detection zone selected by the user). Therefore, if the calculated amount of defocus for the focus detection zone selected by the user is invalid, the user has to select another focus detection zone, or to do some other operation, which is troublesome.

SUMMARY OF THE INVENTION

The present invention has been made in view of the aforementioned problems that reside in conventional multi-point autofocus system, and an object of the present invention is to provide a multi-point autofocus system which has an improvement in manual focus-zone selection mode.

To achieve the object mentioned above, according to an aspect of the present invention, a multi-point autofocus system is provided, including a focus detection device which can calculate a defocus amount for each of a plurality of focus detection zones in a picture plane; a selecting device for manually selecting a focus detection zone from the plurality of focus detection zones for which the defocus amount is to be calculated by the focus detection device; and a determining device for determining a valid focus detection zone by which a valid defocus amount can be calculated out of at least one of the plurality of focus detection zones other than the manually-selected focus detection zone, in such a manner that a higher priority is given to a focus detection zone than another focus detection zone of the plurality of focus detection zones in the case where the result of a calculation of the defocus amount of the manually-selected focus detection zone is invalid.

In an embodiment, the determining device assigns priorities to at least one of the plurality of focus detection zones other than the manually-selected focus detection zone in accordance with an algorithm which gives the higher priority to a focus detection zone which is closer to the manually-selected focus detection zone.

In an embodiment, the determining device assigns priorities to at least one of the plurality of focus detection zones other than the manually-selected focus detection zone in accordance with an algorithm which gives the higher priority to a focus detection zone which is closer to a center of the picture plane.

In an embodiment, the determining device assigns priorities to at least one of the plurality of focus detection zones other than the manually-selected focus detection zone in accordance with an algorithm which gives the higher priority to a focus detection zone which is adjacent to the manually-selected focus detection zone.

In an embodiment, the determining device assigns priorities to at least one of the plurality of focus detection zones other than the manually-selected focus detection zone in accordance with an algorithm which gives the higher priority to a focus detection zone which is closer to the manually-selected focus detection zone, and also closer to the center of the picture plane.

In an embodiment, priorities are determined for each of the plurality of focus detection zones which is manually selected with the selecting device as the manually-selected focus detection zone.

Preferably, the determining device includes a data table which represents priorities, wherein the priorities are assigned to at least one of the plurality of focus detection zones in accordance with the manually-selected focus detection zone.

Preferably, the picture plane has a rectangular shape, and the plurality of focus detection zones includes a central focus detection zone positioned at substantially a center of the picture plane; at least one of left and right focus detection zones which are provided on the picture plane on the left and right sides of the central focus detection zone, respectively; and at least one of upper and lower focus detection zones which are provided on the picture plane on the upper and lower sides of the central focus detection zone, respectively.

In an embodiment, the determining device assigns the priorities to the at least one of the plurality of focus detection zones other than the manually-selected focus detection zone in such a manner that a higher priority is given to the upper focus detection zones in a case where the central focus detection zone is manually selected with the selecting device and where the focus detection device cannot calculate a valid defocus amount for the central focus detection zone which is selected by the selecting device.

In an embodiment, the determining device assigns the priorities to the at least one of the plurality of focus detection zones other than the manually-selected focus detection zone in such a manner that a higher priority is given to the at least one of upper and lower focus detection zones in a case where the central focus detection zone is manually selected with the selecting device and where the focus detection device cannot calculate a valid defocus amount for the central focus detection zone which is selected by the selecting device.

In an embodiment, the multi-point autofocus system further includes an indicator which lights up a first portion on the picture plane corresponding to one of the plurality of focus detection zones which is manually selected with the selecting device.

In an embodiment, the multi-point autofocus system further includes an indicator which lights up a first portion on the picture plane corresponding to one of the plurality of focus detection zones for which the determining device determines that a valid defocus amount can be calculated by the focus detection device.

In an embodiment, the indicator firstly lights up the first portion on the picture plane; and in the case where the focus detection device cannot calculate a valid defocus amount for the manually-selected focus detection zone and the determining device determines that a valid defocus amount can be calculated for one of the plurality of focus detection zones other than the manually-selected focus detection zone, the indicator subsequently lights up a second portion on the picture plane corresponding to the one of the plurality of focus detection zones other than the manually-selected focus detection zone while making the first portion flashing on and off.

In an embodiment, the multi-point autofocus system can be incorporated in a camera, wherein the indicator indicates the first portion in a field of view of a viewfinder of the camera.

In an embodiment, the multi-point autofocus system is incorporated in a camera, wherein the indicator indicates the first and second portions in a field of view of a viewfinder of the camera.

In an embodiment, the multi-point autofocus system is incorporated in a camera, wherein the indicator includes an external display panel provided on a body of the camera. In an embodiment, the multi-point autofocus system is incorporated in a camera having an automatic focus-zone selection mode in which a focus detection zone is automatically selected from the plurality of focus detection zones, and a manual focus-zone selection mode in which a focus detection zone can be manually selected from the plurality of focus detection zones with the selecting device.

In an embodiment, the determining device operates only in the manual focus-zone selection mode.

The present disclosure relates to subject matter contained in Japanese Patent Application No. 2000-204278 (filed on Jul. 5, 2000) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENT

Figure 1:
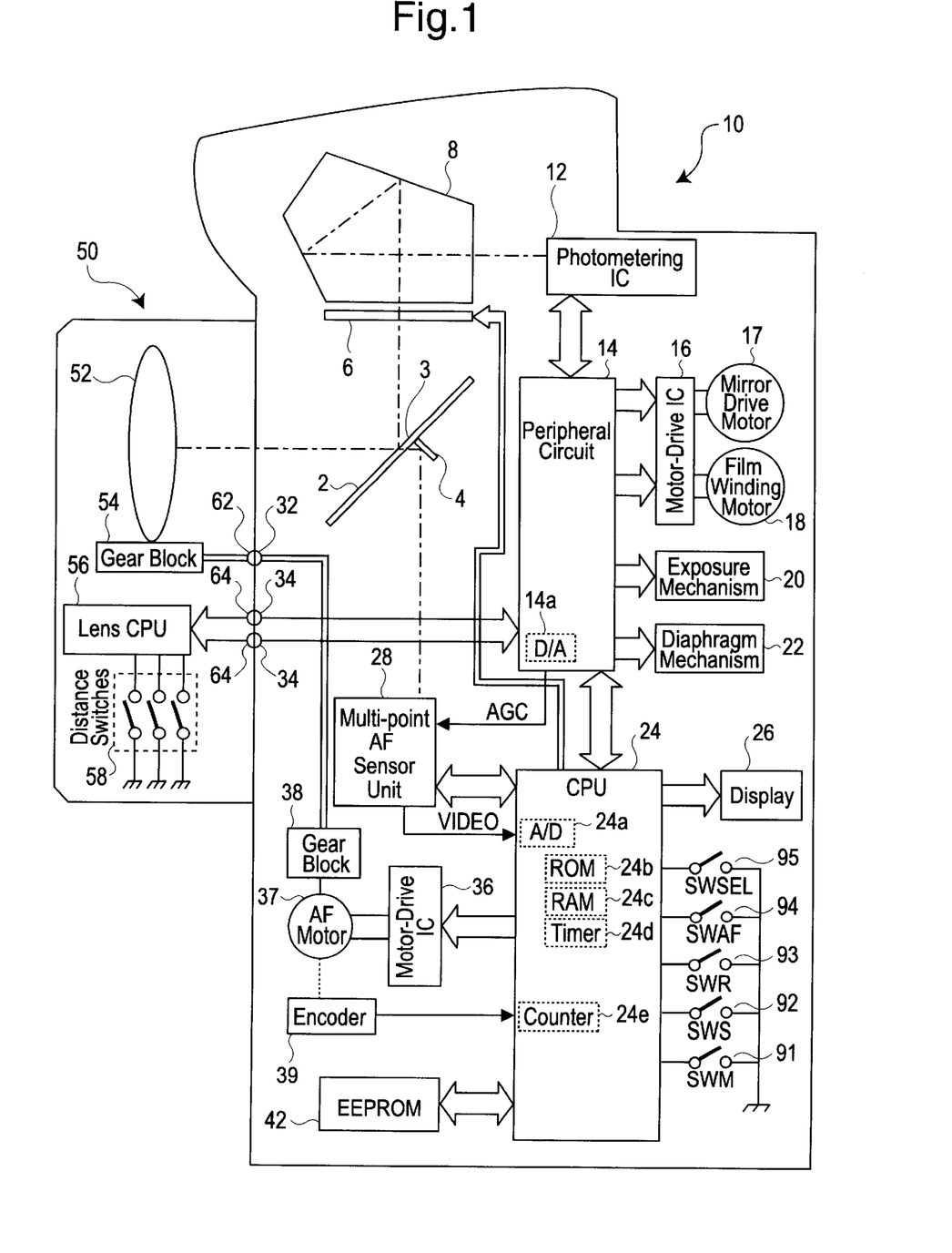
FIG. 1 is a block diagram of fundamental components of an SLR camera system provided with a multi-point autofocus system according to the present invention.

FIG. 1 shows a block diagram of fundamental elements of an SLR (single-lens-reflex) camera system provided with a multi-point autofocus system according to the present invention. The autofocus SLR camera system includes a camera body 10 and an interchangeable photographing lens 50 detachably attached to the camera body 10. In the camera body 10, two exposure modes are available: an automatic focus-zone selection mode in which a focus detection zone is automatically selected from a plurality of focus detection zones, and a manual focus-zone selection mode in which a focus detection zone can be manually selected by the user from the plurality of focus detection zones.

The camera body 10 is provided with a CPU 24 which comprehensively controls the overall operations of the SLR camera system, and a multi-point AF sensor unit 28. The CPU 24 and the multi-point AF sensor unit 28 constitute the above-mentioned multi-point autofocus system. The CPU 24 serves as a focus detection device for calculating a defocus amount for each focus detection zone in accordance with signals output from the multi-point AF sensor unit 28. The CPU 24 also serves as a determining device for determining an optimum focus detection zone among all the focus detection zones other than the focus detection zone selected by the user in the manual focus-zone selection mode if an in-focus state cannot be obtained (i.e., a valid defocus amount cannot be calculated) at the focus detection zone selected by the user.

A major portion of object light (light which is to form an object image to be photographed) entering the camera body 10 through a focusing lens group (movable lens group) 52, provided in the photographing lens 50, is reflected by a main mirror (quick-return mirror) 2 toward a pentagonal prism 8, which is a fundamental element of a finder optical system provided in the camera body 50. Subsequently, the object light is reflected more than once by the pentagonal prism 8 and emerges out of an eyepiece (not shown) positioned behind the pentagonal prism 8. A portion of the light reflected by the pentagonal prism 8 enters a light-receiving element of a photometering IC 12. The photometering IC 12 generates, e.g., an electrical signal, the voltage of which is compressed logarithmically to provide information on the amount of received light to the CPU 24 via a peripheral control circuit 14 to which the photometering IC 12 is connected. The CPU 24 performs an AE calculation (exposure operation) in accordance with film information and also information on received light amount input from the photometering IC 12 to calculate an optimum combination of a shutter speed and an aperture value. At the time of a photographic exposure, the CPU 24 controls an exposure mechanism 20 and a diaphragm mechanism 22, which are connected to the peripheral control circuit 14, in accordance with the optimum combination of a shutter speed and an aperture value to expose a film frame. At the same time, the CPU 24 actuates a mirror drive motor 17 to move a quick-return mirror 2 up and down via the peripheral control circuit 14 and a motor-drive IC 16. Upon the completion of an exposure, the CPU 24 controls a film winding motor 18 to wind the film by one frame.

Part of the object light which is incident on the main mirror 2 passes through a half mirror portion 3 on the main mirror 2 to be reflected downwardly by an auxiliary mirror 4 provided at the rear of the main mirror 2. The light reflected downwardly by the auxiliary mirror 4 enters the multi-point AF sensor unit 28. The multi-point AF sensor unit 28 is a phase-difference type distance measuring sensor, and is provided therein with a plurality of pairs of line sensors (six pairs of line sensors in the present embodiment) which correspond to a plurality of focus detection zones (six focus detection zones in the present embodiment) determined in a rectangular picture plane of the camera. In the multi-point AF sensor unit 28, a light bundle which passes through each of the plurality of focus detection zones in the picture plane is divided into two light bundles to be formed as two images on a corresponding pair of line sensors, respectively. Each line sensor includes an array of photodiodes (array of light receiving elements), and each photodiode accumulates (integrates) an electric charge for a predetermined time in accordance with the brightness of the object image formed on the photodiode. The accumulated electric charges are read out of the photodiodes to be converted into a video signal. This video signal is input to the CPU 24. The CPU 24 determines a phase difference between the pair of object images respectively formed on the pair of line sensors using an algorithm according to a phase difference detecting method known in the art. Furthermore, an example of the construction of the multi-point AF sensor unit 28 is disclosed in U.S. Pat. No. 6,128,444.

Figure 2:
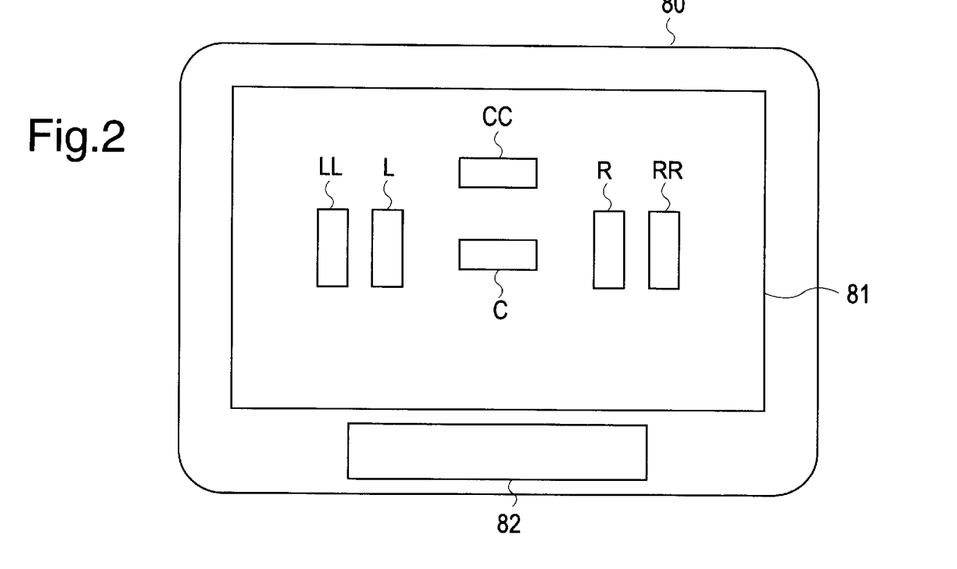
FIG. 2 is a diagram of a viewing area seen through the viewfinder of a camera body shown in FIG. 1.

FIG. 2 shows a viewing area 80 seen through the viewfinder of the SLR camera system. As shown in FIG. 2, a picture plane 81 seen in the viewing area 80 has a horizontally-elongated rectangular shape having a long side (horizontal side) and a short side (vertical side), and is provided therein with six focus detection zones (focus detection points) C, CC, L, LL, R, and RR. The central focus detection zone C is a horizontally elongated zone positioned substantially central to the viewing area 80. The upper-central focus detection zone CC is a horizontally-elongated zone positioned above the central focus detection zone C. The central focus detection zone C and the upper-central focus detection zone CC are substantially parallel to each other. The left focus detection zone L and the right focus detection zone R are vertically-elongated zones, and are positioned on respective sides of the central and upper central focus detection zones C and CC. The leftmost focus detection zone LL is a vertically-elongated zone, and is positioned on the left side of the left focus detection zone L as viewed in FIG. 2. The rightmost focus detection zone RR is also a vertically-elongated zone, and is positioned on the right side of the right focus detection zone R as viewed in FIG. 2. The vertically-elongated focus detection zones L, R, LL and RR are substantially parallel to one another. The focus detection zones R, RR and L and LL lie on a line which extends in a horizontal direction of the picture plane 81 across the central focus detection zone C (i.e., which extends parallel to a long side of the picture plane 81 across the central focus detection zone C), while the upper-central focus detection zone CC lies on a line which extends in a vertical direction of the picture plane 81 across the central focus detection zone C (i.e., which extends parallel to a short side of the picture plane 81 across the central focus detection zone C).

Referring back to FIG. 1, the CPU 24 determines and calculates the rotational direction and the number of revolutions of an AF motor 37 (i.e., the number of pulses to be output from an encoder 39) necessary for moving the focusing lens group 52 to an in-focus position thereof in accordance with the calculated defocus amount to drive the AF motor 37 via a motor-drive IC 36. Rotation of the AF motor 37 is transmitted to a lens gear block 54 via a body gear block 38 and a connection between a joint 32 provided on a mount (body mount) of the camera body 10 and another joint 62 provided on a corresponding mount (lens mount) of the photographing lens 50. The photographing lens 51 is provided therein with the aforementioned lens gear block 54 for transmitting the rotation of the joint 62 to the focusing lens group 52, so that the focusing lens group 52 is driven by the AF motor 37 via the body gear block 38, the joints 32 and 62, and the lens gear block 54.

The CPU 24 is provided therein with an A/D converter 24a, a ROM 24b, a RAM 24c, a timer 24d and a pulse counter 24e. The A/D converter 24a converts an analogue video signal transmitted from the CCD line sensors of the multi-point AF sensor unit 28 into a digital video signal. Predetermined programs are stored in the ROM 24b, while data for the calculating operation and control operation is temporarily stored in the RAM 24c. The pulse counter 24e counts pulses of the signal output from the encoder 39, which converts revolutions of the AF motor 37 into electrical pulses. An EEPROM 42 which is connected to the CPU 24 stores therein various inherent constants of the camera body 10 and predetermined values necessary for the CPU 24 to perform an AF process ("AF Process" shown in FIG. 4).

A main switch (SWM) 91, a photometering switch (SWS) 92, a release switch (SWR) 93, an AF switch (SWAF) 94 and a select switch (selecting device/SWSEL) 95 are connected to the CPU 24. The SLR camera system shown in FIG. 1 can be operated upon turning ON the main switch (SWM) 91. The photometering switch (SWS) 92 is turned ON when a release button (not shown) is depressed by a half step. The release switch 93 is turned ON when the release button is fully depressed. Upon the release switch 93 being turned ON, the shutter is released to expose a film frame. The AF switch 94 is operated by the user to select either autofocus mode or manual focus mode. Autofocus mode is selected when the AF switch 94 is turned ON. The select switch 95 is operated by the user to select either the automatic focus-zone selection mode or the manual focus-zone selection mode. A focus detection zone is automatically selected from the six focus detection zones C, CC, L, LL, R, and RR in the automatic focus-zone selection mode, while a focus detection zone can be manually selected by the user from the six focus detection zones C, CC, L, LL, R, and RR in the manual focus-zone selection mode.

The camera body 10 is provided thereon with an external display panel (e.g., an LCD panel) 26, and the camera body is also provided therein with a viewfinder LCD panel 6. The CPU 24 sends signals to the external display panel 26 to indicate various photographic information, and at the same time drives the viewfinder LCD panel 6 to indicate similar photographic information as viewfinder indication 82 at the bottom of the viewing area 80. FIGS. 3A through 3D show examples of the viewfinder indication 82 indicated on the viewfinder LCD panel 6 which can be seen at the bottom of the viewing area 80 (see FIG. 2). The viewfinder indication 82 will be discussed in detail later.

The photographing lens 50 is provided therein with a lens CPU 56. The lens CPU 56 is connected to the peripheral control circuit 14 via a series of electrical contacts 64 formed on the aforementioned lens mount of the photographing lens 50 and a corresponding series of electrical contacts 34 formed on the aforementioned body mount of the camera body 10 to transmit information on the photographing lens 50 to the CPU 24. The information on the photographing lens 50 which is transmitted from the lens CPU 56 to the CPU 24 includes, e.g., the aperture value Av at the open aperture of the photographing lens 50 (i.e., the aperture value of APEX system at open aperture), the aperture value Av at stopped aperture of the photographing lens 50, and the K value. The K value corresponds to the number of pulses output from the encoder 39 when a focal plane formed via the photographing lens 50 is moved in the optical axis direction thereof by a unit length by rotation of the AF motor 37. The lens CPU 56 determines the axial position of the focusing lens group 52 via a series of distance switches 58 to transmit the information on the axial position of the focusing lens group 52 to the CPU 24.

Figure 3A:
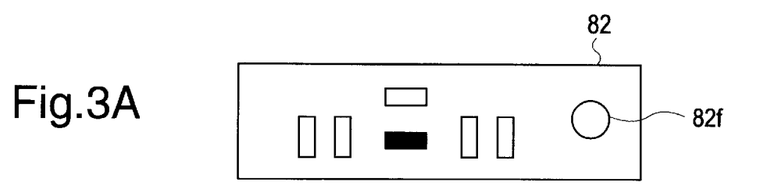
FIG. 3A is a diagram of a viewfinder indication indicated on an LCD panel which can be seen at the bottom of the viewing area shown in FIG. 2.
Figure 3B:
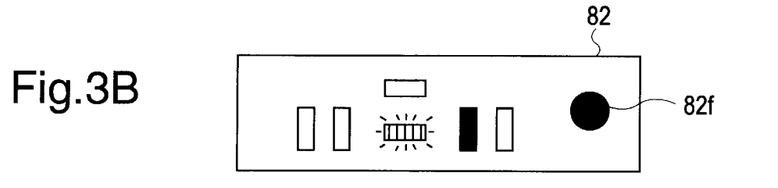
FIG. 3B is a diagram of viewfinder indication indicated on the LCD panel which can be seen at the bottom of the viewing area shown in FIG. 2.

FIG. 2 shows the viewing area 80 as seen through the viewfinder of the camera body shown in FIG. 1. In the viewing area 80, the picture plane 81 and the viewfinder indication 82 indicated on the viewfinder LCD panel 6 can be seen through the viewfinder. In the illustrated embodiment, the six focus detection zones (focus detection points) C, CC, L, LL, R, and RR are provided in the picture plane 81, and the autofocus operation can be performed at each of the six focus detection zones. FIGS. 3A through 3D each show the viewfinder indication 82 indicated on the viewfinder LCD panel 6. The viewfinder indication 82 includes six segments arranged to correspond to the six focus detection zones C, CC, L, LL, R, and RR so that each segment can be controlled to light up. FIGS. 3A and 3B show the viewfinder indication 82 in the manual focus-zone selection mode. If one of the six focus detection zones is selected by the user after he or she selects the manual focus-zone selection mode, the segment (first portion) in the viewfinder indication 82 which corresponds to the selected focus detection zone lights up. FIG. 3A shows the viewfinder indication 82 at the time the central focus detection zone C is selected by the user. FIG. 3B shows the viewfinder indication 82 at the time the calculated defocus amount is valid (i.e., an in-focus state is obtained) for the right focus detection zone R after it is determined that the calculated defocus amount is invalid (i.e., an in-focus state cannot be obtained) for the central focus detection zone C selected by the user. This control is performed according to the AF process (see FIG. 5) which will be discussed in detail later. In this case shown in FIG. 3B, the segment (second portion) in the viewfinder indication 82 which corresponds to the right focus detection zone R lights up while the segment (first portion) in the viewfinder indication 82 which corresponds to the central focus detection zone C flashes on and off (blinks).

Figure 4:
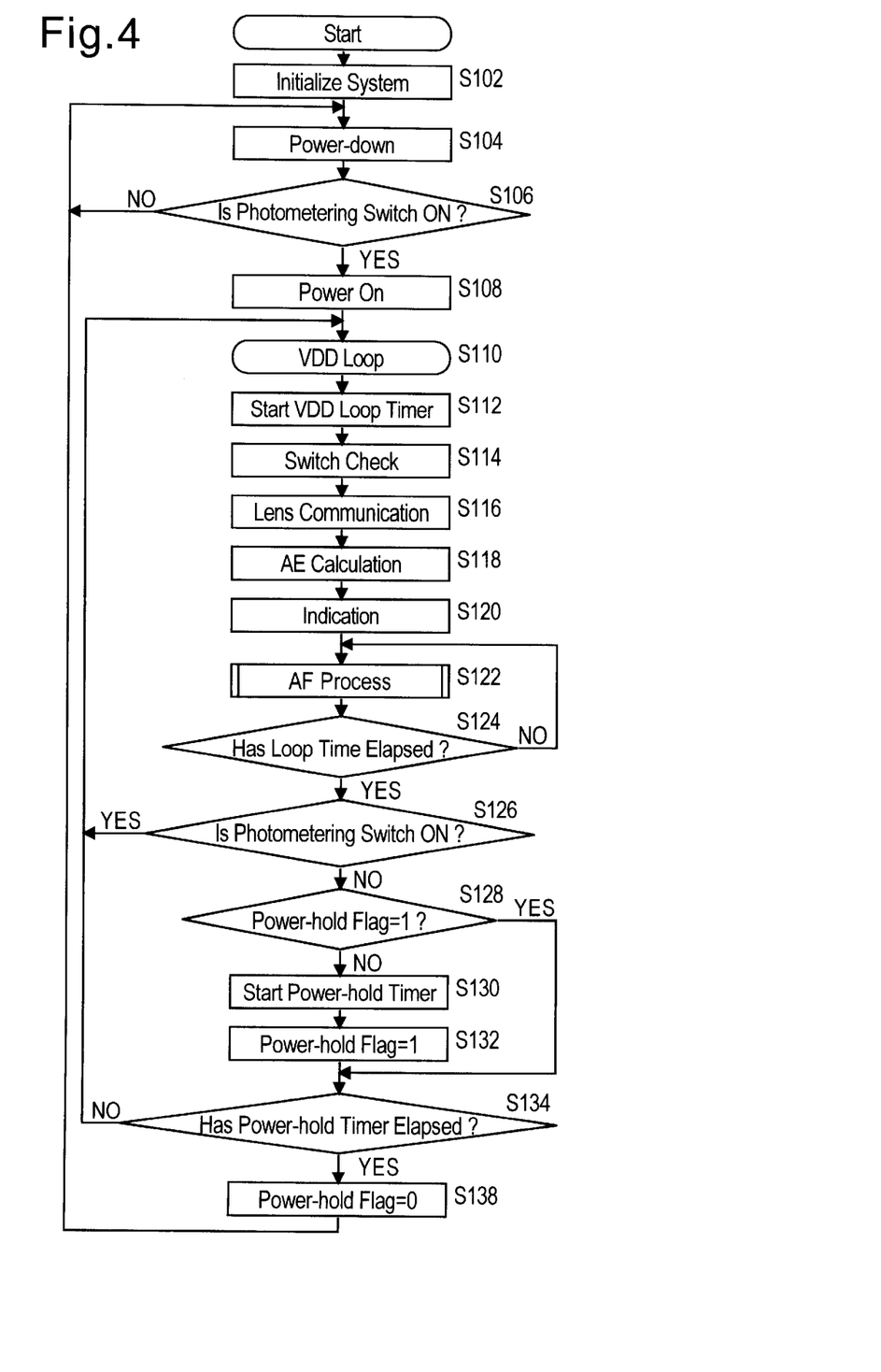
FIG. 4 is a flow chart of a main routine performed in the SLR camera system shown in FIG. 1.
Figure 5:
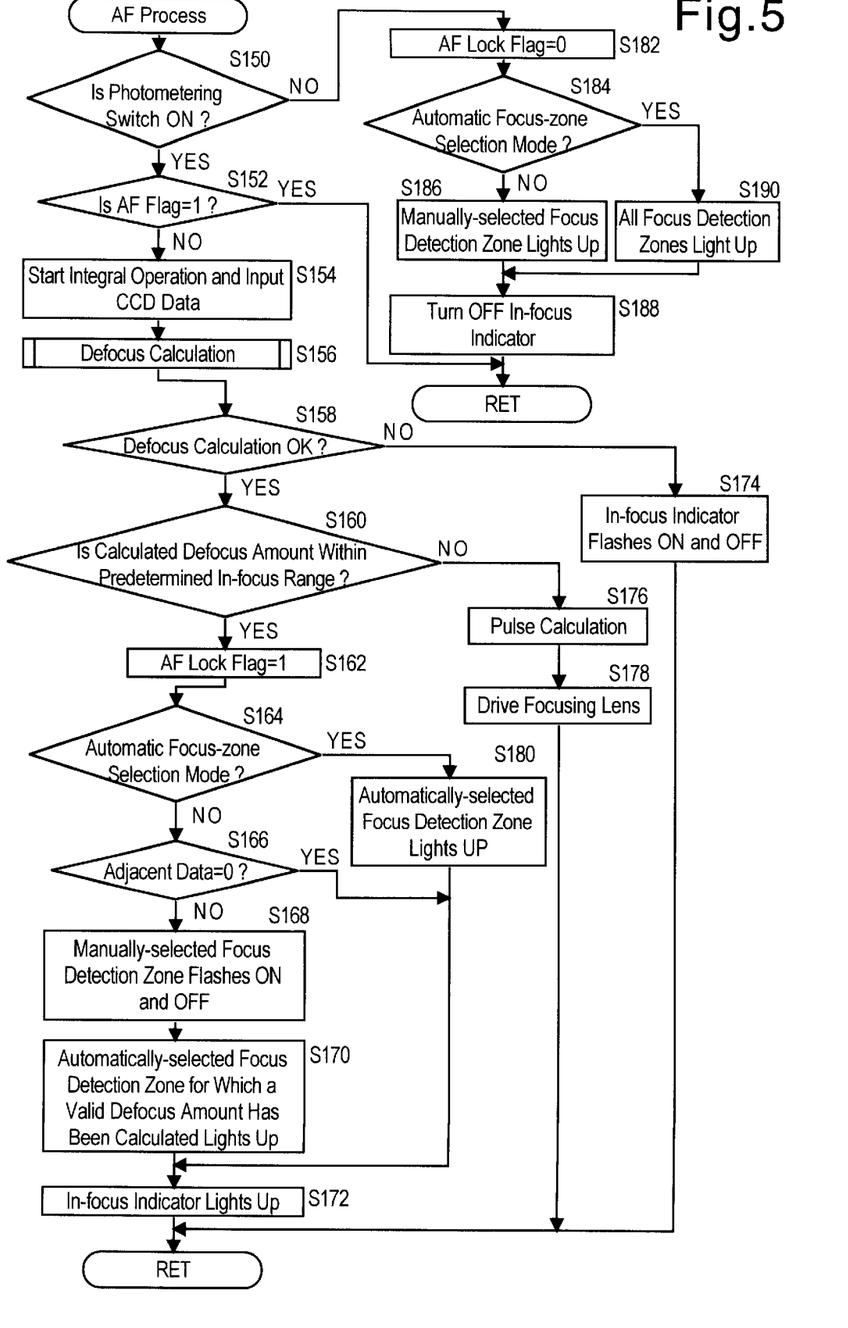
FIG. 5 is a flow chart of a subroutine "AF Process" in the main routine shown in FIG. 4.
Figure 6:
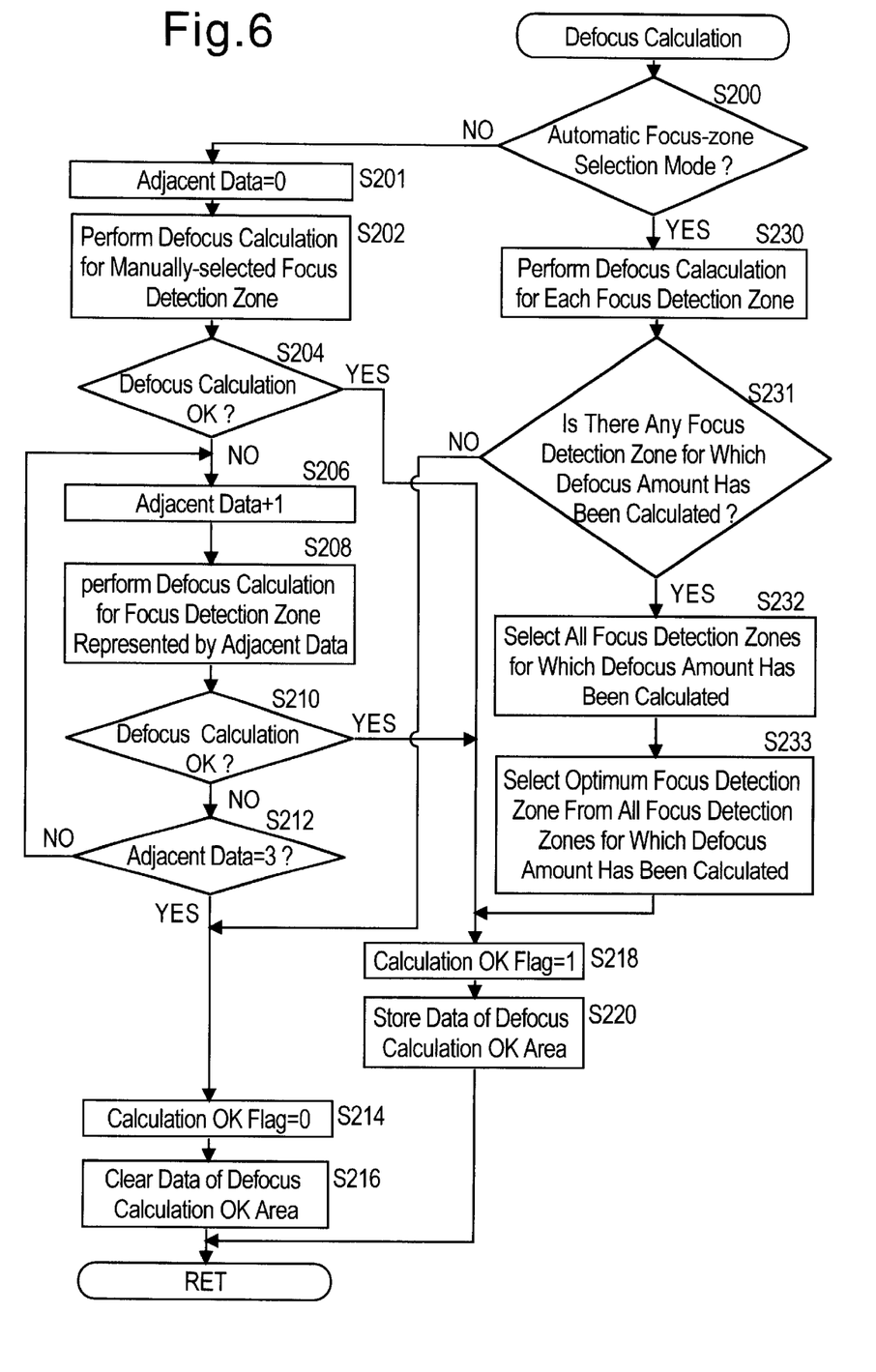
FIG. 6 is a flow chart of a subroutine "Defocus Calculation" in the subroutine "AF Process" shown in FIG. 5.

FIG. 4 shows a flow chart of a main routine performed by the CPU 24 of the SLR camera system shown in FIG. 1, FIG. 5 is a flow chart of a subroutine "AF Process" at step S122 in the main routine shown in FIG. 4, and FIG. 6 is a flow chart of a subroutine "Defocus Calculation" at step S156 in the subroutine "AF Process" shown in FIG. 5.

The main routine starts immediately after the main switch 91 is turned ON. In the main routine, firstly predetermined elements, circuits (e.g., the peripheral control circuit 14) and ports of the camera system are initialized (step S102), and subsequently a power down process is performed (step S104). The power down process is a "stand-by process" in which no power is supplied to elements or circuits other than the CPU 24 to reduce power consumption. Subsequently, it is determined whether the photometering switch 92 is turned ON (step S106).

If the photometering switch 92 is turned ON by the release button of the camera body being depressed by a half step (if "Yes" at step S106), electrical power is supplied to the peripheral devices and circuits to perform a VDD loop process (step S108).

In the VDD loop process (step S110), firstly a VDD loop timer starts at step S112, and the state of each switch (i.e., the main switch 91,the photometering switch 92, the release switch 93, the AF switch 94 and the select switch 95) is checked (step S114). Thereafter, the CPU 24 communicates with the lens CPU 56 and inputs lens data such as the aperture value Av at open aperture of the photographing lens 50, the aperture value Av at stopped aperture of the photographing lens 50, and the aforementioned K value, etc. (step S116). Thereafter, an AE calculation is carried out (step S118), and photographic data (e.g., an optimum combination of a shutter speed and an aperture value) obtained by the calculation is indicated on the external display panel 26 (step S120). Thereafter, the AF process is carried out (step S122). The AE calculation refers to an operation in which the brightness of the object is measured by the photometering IC 12 and an optimum combination of a shutter speed and an aperture value at a predetermined exposure mode are calculated in accordance with the brightness data, the film sensitivity data, etc. After the AF process is performed, it is determined whether a predetermined loop operation time has elapsed (step S124). If it is determined at step S124 that the predetermined loop operation time has not yet elapsed, control returns to the AF process at step S122. Accordingly, the AF process is repeated during the loop operation time.

After the lapse of the loop operation time, it is determined whether the photometering switch 92 is ON (step S126). If the photometering switch 92 is ON (if "Yes" at step S126), control returns to the VDD loop operation at step S110. If the photometering switch 92 is OFF (if "No" at step S126), operations at steps S128, S130, S132 and S134 are performed to maintain an ON state of the power for a predetermined period of time (a power hold time). Namely, if the photometering switch 92 is OFF, firstly it is determined whether a power hold flag is 1 (step S128). If the power hold flag is 0 (the power hold flag is 0 when control first enters the operation at step S128), the power hold timer starts (step S130), and the power hold flag is set to 1 (step S132). Conversely, if it is determined at step S128 that the power hold flag is 1 (if "Yes" at step S128), control skips the operations at steps S130 and S132 to proceed the operation at step S134. If the photometering switch 92 is OFF while the power hold time has elapsed (if "Yes" at step S134), the power hold flag is cleared, i.e., set to 0 (step S138). Subsequently, control returns to the power down operation at step S104 to wait for the photometering switch 92 to be turned ON.

The user can select the manual focus-zone selection mode and also one focus detection zone (C, CC, L, LL, R or RR) at which the autofocus operation is to be performed by manually operating the select switch 95 before turning ON the photometering switch 92.

Figure 3C:
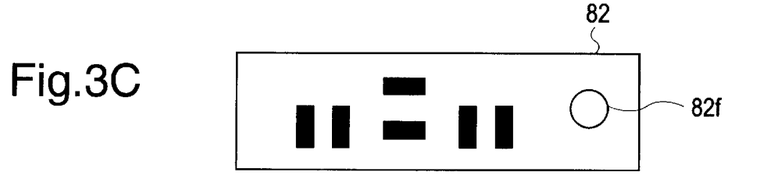
FIG. 3C is a diagram of viewfinder indication indicated on the LCD panel which can be seen at the bottom of the viewing area shown in FIG. 2.

The AF process at step S122 will be described below in more detail with reference to FIG. 5. In the AF process, whether or not the photometering switch 92 is ON is checked (S150). If the photometering switch 92 is OFF, an AF lock flag is cleared (step S182), and subsequently, the viewfinder indication 82, which is indicated on the viewfinder LCD panel 6, is initialized. Namely, if the automatic focus-zone selection mode has been selected with the select switch 95 (if "Yes" at step S184), all the six segments in the viewfinder indication 82 light up as shown in FIG. 3C (step S190). Conversely, if the manual focus-zone detection mode has been selected with the select switch 95 (if "No" at step S184), only one of the six segments which corresponds to the selected focus detection zone lights up as shown in FIG. 3A (step S186). In FIG. 3A only the segment in the viewfinder indication 82 which corresponds to the central focus detection zone C lights up. Thereafter, an in-focus indicator 82*f*, which is turned ON to light up at step S172, is turned OFF (step S188), and control returns to the main routine.

If it is determined at step S150 that the photometering switch 92 is ON, it is determined whether the AF lock flag is 1 (step S152). If the AF lock flag is 1 (if "Yes" at step S152), control returns to the main routine. If the AF lock flag is 0 (if "No" at step S152), control proceeds to step S154 at which the integral operations of the plurality of pairs of CCD line sensors provided in the multi-point AF sensor unit 28 are commenced while the CCD video data is input to the CPU 24 (step S154). Subsequently, a defocus calculation process ("Defocus Calculation" shown in FIG. 6) is performed (step S156). In the defocus calculation process, the defocus amount for the selected focus detection zone or each focus detection zone is calculated, while a focus detection zone at which the autofocus operation is to be performed is selected from the six focus detection zones C, CC, L, LL, R and RR.

It is determined at step S158 whether a defocus amount has been calculated. If it is determined that a defocus amount has been calculated (if "Yes" at step S158), it is determined whether the calculated defocus amount is within a predetermined in-focus range (step S160). If the calculated defocus amount is within the predetermined in-focus range (if "Yes" at step S160), the AF lock flag is set to 1 (step S162).

Conversely, if it is determined that a valid defocus amount could not be calculated (if "No" at step S158), the in-focus indicator 82*f* in the viewfinder indication 82 is actuated to flash on and off (step S174), and control returns to the main routine. If the calculated defocus amount is out of the predetermined in-focus range (if "No" at step S160), the number of pulses corresponding to the calculated defocus amount is calculated using the K value (step S176), and subsequently, the focusing lens group 52 is moved by an amount corresponding to the calculated number of pulses (step S178). Thereafter, control returns to the main routine.

Figure 3D:
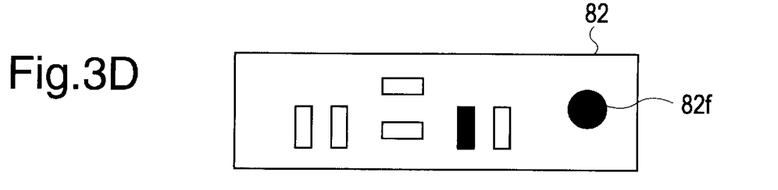
FIG. 3D is a diagram of viewfinder indication indicated on the LCD panel which can be seen at the bottom of the viewing area shown in FIG. 2.

It is determined at step S164 whether the automatic focus-zone selection mode has been selected. If the automatic focus-zone selection mode has been selected (if "Yes" at step S164), the in-focus indicator 82*f* in the viewfinder indication 82 lights up while only the segment corresponding to one of the six focus detection zones (C, CC, L, LL, R or RR) which has been selected according to a predetermined algorithm in the defocus calculation process lights up as shown in FIG. 3D (step S180). In FIG. 3D only the segment in the viewfinder indication 82 which corresponds to the right focus detection zone R lights up. Thereafter control proceeds to step S172.

Conversely, if the automatic focus-zone selection mode has not been selected (if "No" at step S164), it is determined whether adjacent data (variable n) is 0 (step S166). The adjacent data will be discussed in detail later by reference to the subroutine "Defocus Calculation" shown in FIG. 6. That the adjacent data n is a value other than 0 means that a valid defocus amount for the focus detection zone selected by the user could not be calculated and that one focus detection zone except the focus detection zone selected by the user has been selected for the autofocus operation in the defocus calculation process. Therefore, if it is determined that the adjacent data n is 0 (if "Yes" at step S166), the segment in the viewfinder indication 82 which corresponds to one of the six focus detection zones (C, CC, L, LL, R or RR) which has been selected by the user remains lit up, and control proceeds to step S172 at which the in-focus indicator 82*f* lights up. Subsequently, control returns to the main routine. If it is determined that the adjacent data n is a value other than 0 (if "No" at step S166), the segment in the viewfinder indication 82 which corresponds to one of the six focus detection zones (C, CC, L, LL, R or RR) selected by the user flashes on and off to indicate that a valid defocus amount could not be calculated at the manually-selected focus detection zone (step S168). Subsequently, the segment in the viewfinder indication 82 which corresponds to another focus detection zone which has been automatically selected in the defocus calculation process lights up (step S170) in a manner such as shown in FIG. 3B. In the viewfinder indication 82 shown in FIG. 3B, the central focus detection zone C selected in advance by the user flashes on and off, and the right focus detection zone R selected automatically by the camera lights up. After the operation at step S170 is performed, the in-focus indicator 82*f* lights up (step S172).

The defocus calculation process at step S156 will be described below in more detail with reference to FIG. 6. In the defocus calculation process, firstly it is determined whether the automatic focus-zone selection mode has been selected (step S200). If the automatic focus-zone selection mode has been selected (if "Yes" at step S200), the defocus calculation is performed for each of the six focus detection zones C, CC, L, LL, R and RR (step S230), and subsequently it is determined whether there is any focus detection zone for which a defocus amount has been calculated (step S231). If it is determined at step S231 that there is no focus detection zone for which a defocus amount has been calculated, control proceeds to step S214 at which a calculation OK flag is cleared. Subsequently, an area of memory in which data of a selected focus detection zone for which a defocus amount has been calculated is stored is also cleared (step S216). Conversely, if there is at least one focus detection zone for which a defocus amount has been calculated (if "Yes" at step S231), this focus detection zone or zones are selected from the six focus detection zones (step S232), and an optimum focus detection zone is selected from the selected focus detection zone or zones according to a predetermined algorithm (step S233). Subsequently, control proceeds to step S218 at which the calculation OK flag is set to 1, and subsequently, data of the selected focus detection zone for which a defocus amount has been calculated is stored in a predetermined area of memory (step S220). Thereafter control returns to the AF process to perform the operation at step S158.

If it is determined at step S200 that the manual focus-zone selection mode has been selected (if "No" at step S200), the adjacent data n is cleared (step S201), and the defocus calculation is performed for one of the six focus detection zones (C, CC, L, LL, R or RR) selected by the user (step S202). Thereafter it is determined whether a defocus amount has been calculated for the selected focus detection zone (step S204). If it is determined at step S204 that a defocus amount has been calculated for the selected focus detection zone, the calculation OK flag is set to 1 (step S218), and subsequently, data of the selected focus detection zone for which a defocus amount has been calculated is stored in a predetermined area of memory (step S220). Thereafter control returns to the AF process to perform the operation at step S158, so that the autofocus operation is carried out in accordance with the defocus amount calculated for the focus detection zone, the data of which is stored at step S220.

Conversely, if it is determined at step S204 that a defocus amount could not be calculated for the selected focus detection zone, the defocus calculation is performed for each of the six focus detection zones C, CC, L, LL, R and RR, except the focus detection zone selected by the user, in a predetermined order of priority which is determined in accordance with a predetermined algorithm which gives a higher priority to a focus detection zone which is closer to the focus detection zone selected by the user and also closer to the center of the picture plane 81 (steps S206 through S212). Table 1 below shows the order of priority according to the above-mentioned algorithm. Note that the designators C, CC, L, LL, R and RR shown in Table 1 correspond to those of the six focus detection zones C, CC, L, LL, R and RR shown in FIG. 2. The order of priority shown in Table 1 is stored in the form of a data table in the EEPROM 42 (see FIG. 1) which is connected to the CPU 24. The CPU 24 inputs the data table stored in the EEPROM 42 therefrom to store the data table in the RAM 24c when predetermined elements, circuits and ports of the camera system are initialized at step S102 of FIG. 4, while the CPU 24 selects a focus detection zone by reference to the data table stored in the RAM 24c.

TABLE 1

| Manually-Selected Focus Detection Zone | Adjacent Data n = 1 | Adjacent Data n = 2 | Adjacent Data n = 3 |
|---|---|---|---|
| C | CC | R | L |
| CC | C | R | L |
| R | C | CC | RR |
| L | C | CC | LL |
| RR | R | C | CC |
| LL | L | C | CC |

In Table 1, the column "Manually-Selected Focus Detection Zone" represents the focus detection zone selected by the user. The next column "Adjacent Data n=1" represents the focus detection zone having the highest (first) priority to be selected as a focus detection zone for which the defocus calculation is to be performed in place of the focus detection zone selected by the user. The column "Adjacent Data n=2" represents the focus detection zone having the next highest (second) priority, while the column "Adjacent Data n=3" represents the focus detection zone having the third priority. For instance, in the case where the central focus detection zone C is selected by the user in the manual focus-zone selection mode, the upper-central focus detection zone CC has the first priority after the central focus detection zone C, the right focus detection zone R has the second priority, and the left focus detection zone L has the third priority. The following descriptions will be directed to a particular case where the central focus detection zone C is selected by the user in advance in the manual focus-zone selection mode.

If it is determined at step S204 that a defocus amount could not be calculated for the central focus detection zone C selected by the user (if "No" at step S204), the value of the adjacent data n is incremented by 1 (step S206). Therefore, the defocus calculation is performed for the upper-central focus detection zone CC corresponding to "CC" in the column "Adjacent Data n=1" having the first priority (step S208), and subsequently it is determined whether a defocus amount has been calculated for the selected focus detection zone, i.e., the upper-central focus detection zone CC (step S210). As a result of this determination, if it is determined at step S210 that a defocus amount has been calculated for the upper-central focus detection zone CC, control proceeds to step S218 at which the calculation OK flag is set to 1, and subsequently, data of the upper-central focus detection zone CC is stored in a predetermined area of memory (step S220). Thereafter control returns to the AF process.

Conversely, if it is determined at step S210 that a defocus amount could not be calculated even for the upper-central focus detection zone CC, it is determined whether the adjacent data n is 3 (step S212). Control returns to step S206 from step S212 when control first enters the operation at step S212. The adjacent data n is 1 when control first enters the operation at step S212. Therefore, if it is determined at step S210 that a defocus amount could not be calculated even for the upper-central focus detection zone CC, control returns to step S206 at which one is added to the value of the adjacent data n. Namely, this time the adjacent data n becomes 2, so that the defocus calculation is performed for the right focus detection zone R corresponding to "R" in the column "Adjacent Data n=2" having the second priority (step S208), and subsequently it is determined whether a defocus amount has been calculated for the selected focus detection zone, i.e., the right focus detection zone R (step S210). If it is determined at step S210 that a defocus amount could not be calculated even for the right focus detection zone R, control again returns to step S206 at which one is added to the value of the adjacent data n. Namely, this time the adjacent data n becomes 3, so that the defocus calculation is performed for the left focus detection zone L corresponding to "L" in the column "Adjacent Data n=3" having the third priority (step S208), and subsequently it is determined whether a defocus amount has been calculated for the selected focus detection zone, i.e., the left focus detection zone L (step S210). If it is determined at step S210 that a defocus amount could not be calculated even for the left focus detection zone L, it is determined at step S212 that the adjacent data n is 3, so that control proceeds to step S214 at which the calculation OK flag is cleared, and subsequently, an area of memory in which data of a selected focus detection zone for which a defocus amount has been calculated is stored is also cleared (step S216). Accordingly, whether or not a defocus amount could be calculated can be determined in the operations at and after step S156 in the AF process shown in FIG. 5. Furthermore, it can be determined which focus detection zone the defocus amount could be calculated in the operations at and after step S156 in the AF process shown in FIG. 5.

For instance, in the case where the right focus detection zone R is selected by the user in the manual focus-zone selection mode and where a defocus amount could not be calculated for the right focus detection zone R; the central focus detection zone C, which is the closest to the center of the picture plane 81, is given the first priority after the right focus detection zone R, the upper-central focus detection zone CC, which is closer to the center of the picture plane 81 than the rightmost focus detection zone RR, is given the second priority; and the rightmost focus detection zone RR is given the third priority.

The order of priority for the selection of focus detection zones is not limited solely to the above described particular order of priority described in Table 1. For instance, according to the order of priority shown in Table 1, if a focus detection zone which is close to either short side of the picture plane 81 is selected by the user, e.g., the rightmost focus detection zone RR, the focus detection zone having the first priority after the rightmost focus detection zone RR is the right focus detection zone R which is closer to the rightmost focus detection zone RR than any other focus detection zones. However, in this case, the focus detection zone having the first priority after the rightmost focus detection zone RR can be a focus detection zone which is closest to the center of the picture plane 81, i.e., the central focus detection zone C, while the focus detection zone having the second priority can be a focus detection zone which is next closest to the center of the picture plane 81, i.e., the right focus detection zone R, according to a certain algorithm which gives a higher priority to a focus detection zone which is closer to the center of the picture plane 81. Such a modification of the algorithm can be easily done by rewriting the data table (which corresponds to the order of priority shown in Table 1) stored in the EEPROM 42.

Alternatively, different algorithms can be used for different focus detection zones, respectively. For instance, a higher priority can be given to a focus detection zone after the focus detection zone selected by the user according to a first algorithm which gives a higher priority to a focus detection zone which is closer to the center of the picture plane 81 if the focus detection zone selected by the user is in the vicinity of the center of the picture plane 81, while a higher priority can given to a focus detection zone after the focus detection zone selected by the user according to a second algorithm which gives a higher priority to a focus detection zone which is closer to the focus detection zone selected by the user if the focus detection zone selected by the user is in the vicinity of the periphery of the picture plane 81.

The above described manner of assigning priorities to the focus detection zones can be applied to any other autofocus systems having different numbers and arrangements of focus detection zones. It should be noted that the multi-point autofocus system having the above described structure can be used for not only an autofocus camera but also any other optical instrument.

As can be understood from the foregoing, according to the present invention, even if a defocus amount cannot be calculated for the focus detection zone selected by the user in the manual focus-zone selection mode, another focus detection zone which is considered in conformity with the user's intention is automatically selected. Therefore, the autofocus operation does not have to stop performing the subsequent operations even if a defocus amount cannot be calculated for the focus detection zone selected by the user in manual focus-zone selection mode, so that the user can keep on operating the camera in manual focus-zone selection mode. Namely, according to the present invention, a multi-point autofocus system which has an improved manual focus-zone selection mode is achieved.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A multi-point autofocus system comprising:
    a focus detection device which can calculate a defocus amount for each of a plurality of focus detection zones in a picture plane;
    a selecting device for manually selecting a focus detection zone from said plurality of focus detection zones for which said defocus amount is to be calculated by said focus detection device; and
    a determining device for determining a valid focus detection zone by which a valid defocus amount can be calculated out of at least one of said plurality of focus detection zones other than said manually-selected focus detection zone, in such a manner that a higher priority is given to a focus detection zone than another focus detection zone of said plurality of focus detection zones in the case where the result of a calculation of said defocus amount of said manually-selected focus detection zone is invalid.

2. The multi-point autofocus system according to claim 1, wherein said determining device assigns priorities to said at least one of said plurality of focus detection zones other than said manually-selected focus detection zone in accordance with an algorithm which gives said higher priority to a focus detection zone which is closer to said manually-selected focus detection zone.

3. The multi-point autofocus system according to claim 1, wherein said determining device assigns priorities to said at least one of said plurality of focus detection zones other than said manually-selected focus detection zone in accordance with an algorithm which gives said higher priority to a focus detection zone which is closer to a center of said picture plane.

4. The multi-point autofocus system according to claim 1, wherein said determining device assigns priorities to said at least one of said plurality of focus detection zones other than said manually-selected focus detection zone in accordance with an algorithm which gives said higher priority to a focus detection zone which is adjacent to said manually-selected focus detection zone.

5. The multi-point autofocus system according to claim 1, wherein said determining device assigns priorities to said at least one of said plurality of focus detection zones other than said manually-selected focus detection zone in accordance with an algorithm which gives said higher priority to a focus detection zone which is closer to said manually-selected focus detection zone and also closer to said center of said picture plane.

6. The multi-point autofocus system according to claim 1, wherein priorities are determined for each of said plurality of focus detection zones which is manually selected with said selecting device as said manually-selected focus detection zone.

7. The multi-point autofocus system according to claim 1, wherein said determining device includes a data table which represents priorities, wherein said priorities are assigned to said at least one of said plurality of focus detection zones in accordance with said manually-selected focus detection zone.

8. The multi-point autofocus system according to claim 1, wherein said picture plane has a rectangular shape, and
    wherein said plurality of focus detection zones comprises:
    a central focus detection zone positioned at substantially a center of said picture plane;
    at least one of left and right focus detection zones which are provided on said picture plane on the left and right sides of said central focus detection zone, respectively; and
    at least one of upper and lower focus detection zones which are provided on said picture plane on at least one of the upper and lower sides of said central focus detection zone, respectively.

9. The multi-point autofocus system according to claim 8, wherein said determining device assigns said priorities to said at least one of said plurality of focus detection zones other than said manually-selected focus detection zone in such a manner that a higher priority is given to said at least one of upper and lower focus detection zones in a case where said central focus detection zone is manually selected with said selecting device and where said focus detection device cannot calculate a valid defocus amount for said central focus detection zone which is selected by said selecting device.

10. The multi-point autofocus system according to claim 8, further comprising an indicator which lights up a first portion on said picture plane corresponding to one of said plurality of focus detection zones which is manually selected with said selecting device.

11. The multi-point autofocus system according to claim 8, further comprising an indicator which lights up a first portion on said picture plane corresponding to one of said plurality of focus detection zones for which said determining device determines that a valid defocus amount can be calculated by said focus detection device.

12. The multi-point autofocus system according to claim 10, wherein said indicator firstly lights up said first portion on said picture plane; and wherein, in the case where said focus detection device cannot calculate a valid defocus amount for said manually-selected focus detection zone and said determining device determines that a valid defocus amount can be calculated for one of said plurality of focus detection zones other than said manually-selected focus detection zone, said indicator subsequently lights up a second portion on said picture plane corresponding to said one of said plurality of focus detection zones other than said manually-selected focus detection zone while making said first portion flash on and off.

13. The multi-point autofocus system according to claim 10, wherein said multi-point autofocus system is incorporated in a camera, said indicator indicating said first portion in a field of view of a viewfinder of said camera.

14. The multi-point autofocus system according to claim 12, wherein said multi-point autofocus system is incorporated in a camera, said indicator indicating said first and second portions in a field of view of a viewfinder of said camera.

15. The multi-point autofocus system according to claim 10, wherein said multi-point autofocus system is incorporated in a camera, said indicator comprising an external display panel provided on a body of said camera.

16. The multi-point autofocus system according to claim 12, wherein said multi-point autofocus system is incorporated in a camera, said indicator comprising an external display panel provided on a body of said camera.

17. The multi-point autofocus system according to claim 1, wherein said multi-point autofocus system is incorporated in a camera having an automatic focus-zone selection mode in which a focus detection zone is automatically selected from said plurality of focus detection zones, and a manual focus-zone selection mode in which a focus detection zone can be manually selected from said plurality of focus detection zones with said selecting device.

18. The multi-point autofocus system according to claim 17, wherein said determining device operates only in said manual focus-zone selection mode.

19. The multi-point autofocus system according to claim 8, wherein said determining device assigns said priorities to said at least one of said plurality of focus detection zones other than said manually-selected focus detection zone in such a manner that a higher priority is given to said upper focus detection zones in a case where said central focus detection zone is manually selected with said selecting device and where said focus detection device cannot calculate a valid defocus amount for said central focus detection zone which is selected by said selecting device.

* * * * *